United States Patent
Klenke et al.

[15] 3,650,790
[45] Mar. 21, 1972

[54] NACREOUS MICA PIGMENT COMPOSITIONS

[72] Inventors: Edward F. Klenke, Liberty Corner, N.J.; George L. Lewis, Wilmington, Del.

[73] Assignee: E. I. du Pont de Nemours and Company, Wilmington, Del.

[22] Filed: Feb. 13, 1970

[21] Appl. No.: 11,353

[52] U.S. Cl. ........................................... 106/291, 106/308 B
[51] Int. Cl. .................................... C08h 17/04, C09c 1/28
[58] Field of Search ............................. 106/308 B, 291, 309

[56] References Cited

UNITED STATES PATENTS 3,087,828  4/1963  Linton ................................. 106/291
3,532,528  10/1970  Bradshaw et al. ..................... 106/291

Primary Examiner—James E. Poer
Attorney—Frank R. Ortolani

[57] ABSTRACT

Nacreous pigments exhibiting intense interference colors, reduced milkiness and substantial luster are prepared by depositing a thin layer of titanium dioxide on mica flakes, treating the resulting titanium dioxide-coated mica pigment with a soluble silicate in an aqueous slurry at a pH from 7 to 11.5, and calcining the resulting silicate-treated pigment; and the resulting pigment.

6 Claims, No Drawings

NACREOUS MICA PIGMENT COMPOSITIONS

BACKGROUND OF THE INVENTION

This invention relates to nacreous pigment compositions comprising silicate treated particulate metal oxide on mica substrate.

Nacreous pigments are known and presently widely used. Such nacreous pigments are described in U.S. Pat. Nos. 3,087,828 and 3,087,829 to Linton, and are composed of a translucent layer of titanium dioxide or zirconium dioxide particles deposited on micaceous flake.

The color and other optical properties of nacreous pigment vary with the depth of the metal oxide layer. When this oxide layer is about 20 to 100 millimicrons in thickness, the pigment exhibits a silver color. As the thickness is increased up to the maximum of about 250 millimicrons, the pigment exhibits various colors of the spectrum recurring in cyclical succession, the cycles being referred to as first, second or third order colors, due to the optical phenomenon known as interference. Interference is the result of the reflectance of light from the top and bottom surfaces of a film resulting either in a reduction in the intensity of certain wave lengths of the incident light, which is known as "destructive interference," or reinforcement of the intensity of the incident light, which is known as "constructive interference." When the thickness of the film is such that a ray reflected from the top surface of a film is out of phase with a ray that has passed through the film and has been reflected from the bottom surface, there is destructive interference. Further discussion of the optical principles which explain interference colors may be found in such textbooks as *Principles of Optics*, by Born and Wolf, 2nd Ed. 1964, Chapter 7, (Macmillan Co.).

SUMMARY OF THE INVENTION

The improved nacreous pigment of this invention is mica flake substrate coated with hydrous metal oxide particles, which is thereafter treated with a soluble silicate in an aqueous slurry, and is then calcined. It has been discovered that the transparency, luster, interference color, and optical properties of the translucent hydrous metal oxide layer coated on mica flake pigment is improved by applying silicate thereto before calcining the pigment. In general a soluble silicate in aqueous solution is added to a slurry of the oxide-coated mica flakes with adjustment of the pH until the pH ranges from slightly alkaline to 11.5. The slurry is maintained in the pH range of 7 to 11.5 for a short period of time before it is filtered, and the recovered pigment is then calcined in the standard manner. Calcining dehydrates the metal oxide and the silicate, which are hydrous as applied to the mica substrate.

The resulting silicate-treated coated mica of this invention exhibits more intense color, greater luster and transparency in formulations employing pigments, thereby reducing the quantity of such pigment required. This marked improvement in pigment quality and utility also appears as an absence of milkiness of white overtone.

More particularly, in practice of the invention, raw or uncalcined metal oxide-coated mica is prepared according to well known procedures such as those in U.S. Pat. No. 3,087,828 to Linton, which is hereby incorporated herein in its entirety. As shown in Example 1 of that patent, mica flake is slurried in an aqueous solution of titanyl sulfate. The agitated slurry is heated to the boiling point, and boiling is continued for a period of time sufficient to hydrolyze and deposit the desired amount of titanium dioxide on the mica flake. The titanium dioxide-coated mica flake is recovered by filtering and washing with water. For purposes of the present invention, the isolated and washed oxide-coated mica is then reslurried in water for silicate treatment.

The reslurried titanium oxide-coated mica is agitated while a solution of a soluble silicate is added to the slurry. Sufficient silicate is added to the slurry to adjust the pH to above at least 7.0 and preferably to about 9.0 for a complete and reproducible treatment. High silicate concentrations and long periods of agitation increase the rate of treatment but are not necessary for satisfactory coating of the pigment. After addition of the silicate and agitation for a short period of time, the silicate-treated, oxide-coated mica is recovered, as by filtration and then is calcined in the conventional manner, i.e., at about 800° to 1,000° C., without intermediate washing.

Calcining the silicate-treated metal oxide-coated mica flake converts the hydrous metal oxide and silicate to the corresponding oxides and dehydrates the layers. This conversion must be relatively complete and reproducible to assure the intended final pigment color and quality. Calcination results in a decrease in the thickness of the coatings and a shift in interference color corresponding to the new or calcined oxide-coating thickness with some adjustment for the silicate treatment. Experience shows that silicate in small amounts up to 10 percent initially applied to the oxide-coated mica produces the expected interference color shift; as more silicate is used in the slurry, the color shift becomes constant indicating an end-point in treating the metal oxide layer. Above this point additional silicate does not appear to cause additional interference color shift.

The silicate employed in this discovery is thought to neutralize acid in the metal oxide layer leaving in place of the acid radicals silicate which bonds, fills and smoothes the metal oxide layer. Any water soluble silicate which does not adversely affect the other components may be used, but sodium silicate is preferred for its obvious advantages of availability, economy and purity. As noted, sufficient of the silicate is used to effect treatment in the alkaline pH range. The amount of silicate as silica left on the pigment after calcination can range from about 3.5 to 25 percent and from 16 to 22 percent is the preferred amount.

Satisfactory mica substrate for use with this invention is commercially available. Generally the mica flakes can range from those passing through 140 mesh screen (U.S. Standard Sieve Series) down to a lower limit of about five microns. A preferred grade of mica is a water ground white Muscovite mica with flakes ranging in size from approximately 5 to 100 microns in the largest dimension, with the major portion in the 5 to 50 micron range. A product of this type is available under the name "Alsibronz" mica from Franklin Mineral Products Co., Wilmington, Mass. In addition, biotite, related vermiculite, and various synthetic micas in the described particle size range, and especially those which resemble white Muscovite mica, can also be used.

The invention is further illustrated in the following examples. All parts and percentages are by weight unless otherwise indicated.

EXAMPLE 1

Titanium dioxide-coated mica is prepared generally according to known procedures, such as that described in U.S. Pat. No. 3,087,828 to Linton. In this example, a water ground Muskovite mica, is wet-classified to remove mica flakes less than 5 microns in size. The mica used in this example is available under the name "Alsibronz." A 37.4 g. portion of the wet-classified "Alsibronz" mica is slurried in 100 cc. of water at 70° C. An aqueous titanyl sulfate solution weighing approximately 100 grams and containing the equivalent of 14.5 grams of TiO$_2$, is added to the slurry at a uniform rate in a period of about five minutes. A 50 g. portion of 50 percent sulfuric acid is added. The slurry is stirred for one hour and heated to boiling in a period of one-half hour. Boiling is continued until the desired amount of titanium dioxide for the desired color is deposited on the mica as indicated by a visual "in process" water spot test.

The "in process" water spot test consists of depositing on a black background a drop from the boiling slurry containing the mica being coated, diluting this drop with an equal amount of water, and observing the color of the coated mica in the drop. Due to changes in the coated mica upon subsequent treatment, color of the water spot test is not the same as the final coated mica color. The final TiO₂ coated mica color is correlated with the "in process" water spot test and the subsequent treatment methods so that the desired final color is produced. For this example, boiling is stopped when the water spot test shows a red-gold color for the coated mica. The slurry is filtered to recover the titanium dioxide-coated mica and the filter cake is washed sulfate free.

A 3 gm. portion of coated mica prepared as just described is slurried in 30 cc. of water at room temperature. Sodium silicate solution is added until the pH of the resulting mixture is 9.5 to 10.0. The sodium silicate solution contains 28.4 percent silica (W. W. Grade, Du Pont) in water. The slurry is stirred for 15 minutes at room temperature and is then filtered to recover the silicate-treated titanium dioxide-coated mica. The silicate-treated titanium dioxide-coated mica is finished by calcining between 930° and 950° C. for one-half hour. The silica content is about 16 to 22 percent of the pigment.

A second portion of the titanium dioxide-coated mica prepared according to the procedure described but with no silicate treatment is finished in the standard manner as a control. This is calcined at 930° to 950° C. for one-half hour and is used as a standard for comparison with the silicate-treated portion.

These two pigments are compared side by side in a formulation consisting of 0.75 g. of the pigment in 10 g. of acrylic lacquer. A drawdown is made on a black and white comparison card so that the colors of the two samples can be compared. The interference color of each sample appears clearly on the black half of the sample card, so that the difference in the two samples is readily apparent.

The final color of these samples is predominantly gold. The silicate-treated sample clearly appears to be more golden with less red overtone (caused by slight interference color shift), to be less milky or to have little or no hazy overtone, and to have a more intense golden color. The samples are observed and rated on an arbitrary scale of 0 to 99, with 0 to standard. The results for two samples prepared as indicated are given as follows:

| Property | Silicate Treated | Untreated Control |
|---|---|---|
| Color | Less red: rated 99 | Standard: 0 |
| Transparency | More transparent*: rated 99 | Standard: 0 |
| Luster | More luster: rated 29 | Standard: 0 |

* Relates to opacity or "milkiness."

EXAMPLE 2

Using the same procedure as Example 1, a second set of samples is prepared with slight variations: A 25 g. portion of wet-classified "Alsibronz" is slurried in 200 cc. of water at 70° C. A 100 gm. portion of aqueous titanyl sulfate solution (14.5% TiO₂) is added over a 5-minute period. A 40 cc. portion of 50 percent sulfuric acid is added and the slurry is stirred for 1 hour. The slurry is heated to boiling over a ½-hour period and boiled until the "in process" water spot test shows a blue color (which correlates with a final red color). Boiling is stopped and the slurry is filtered. The titanium dioxide-coated mica is washed sulfate free for subsequent treatment.

One portion of the coated mica is slurried in 100 cc. of water at room temperature. Sodium silicate solution as in Example 1 is added to adjust the pH to 9.5–10.0. The slurry is stirred for 10 minutes, filtered, and dried. The silicate-treated titanium dioxide coated mica is calcined at about 930° to 950° C. for one-half hour. For comparison, a second portion of the coated mica but with no silicate treatment is calcined at the same conditions.

As in Example 1, drawdowns of each are made and compared, the following data being obtained:

| Test | Silicate Treated | | Control |
|---|---|---|---|
| Color | more red: | 99 | 0 |
| Transparency | transparent: | 99 | 0 |
| Luster | more luster: | 5 | 0 |

EXAMPLE 3

Following the same general procedure as Example 1, but using 16 grams of "Alsibronz" as received from the supplier, hydrolysis of the aqueous titanyl sulfate is carried out until the "in process" color test shows a second-order purple color (which correlates with a final green color). The coated substrate is recovered and subsequently finished with silicate treatment exactly as in Example 1. Drawdowns are again made and compared and the same pattern of distinct and general superiority is found in the silicate treated pigment.

From the foregoing examples and disclosure it is apparent that this discovery provides an effective way to prepare pigment of pearl through second order red of improved intensity of color and lacking in "milkiness." This is achieved by treating metal oxide coated mica with a soluble silicate, such as sodium or other alkali metal silicate, as detailed. The quantity of metal oxide applied for any given color is a factor known to the art, but generally ranges from about 20 percent (for pearl) to about 50 percent (for copper) based on the pigment weight. While the examples show the use of titanium dioxide, it is considered that zirconium oxide can as well be used while achieving the advantages indicated.

What is claimed is:

1. A process for making a nacreous pigment composition composed of mica substrate in flake form coated with hydrous metal oxide particles as a translucent layer of about 20 to about 250 millimicrons in thickness, and wherein said particles have a size of less than about 0.1 micron, comprising suspending mica flake substrate in an aqueous slurry, depositing hydrous metal oxide particles as a translucent coating on said mica flake, treating the resulting flake in an aqueous slurry with a soluble silicate in an amount such to provide a pH range from about 7 to 11.5, recovering the silicate treated flakes and then calcining them.

2. The process of claim 1 in which the hydrous metal oxide is titanium dioxide.

3. The process of claim 2 in which the soluble silicate is sodium silicate.

4. The process of claim 3 in which the pH of the slurry is at least 9.0.

5. A nacreous pigment composition consisting essentially of coated mica flake, said coating being a translucent layer having a thickness of about 20 to 250 millimicrons of metal oxide particles substantially all of which are less than 0.1 micron, said metal oxide coated mica flake having been treated with a soluble silicate so that silica remaining associated with the layer of metal oxide particles is equal to from about 3.5 to 25 percent of the total pigment weight.

6. A pigment according to claim 5 in which said silica content is about 16 to 22 percent and said metal oxide is titanium dioxide.

* * * * *